United States Patent [19]

Henderson

[11] 4,011,447
[45] Mar. 8, 1977

[54] SYSTEM FOR DETECTING THE EDGES OF A MOVING OBJECT EMPLOYING A PHOTOCELL AND AN AMPLIFIER IN THE SATURATION MODE

[76] Inventor: George R. Henderson, 6217 Picardie Road, Rancho Palos Verdes, Calif. 90274

[22] Filed: Feb. 9, 1976

[21] Appl. No.: 656,328

[52] U.S. Cl. .................. 250/222 R; 250/214 A; 250/560
[51] Int. Cl.² ............................ G01D 21/04
[58] Field of Search ......... 250/560, 561, 568, 221, 250/222 R, 214 R, 214 A

[56] References Cited

UNITED STATES PATENTS

| | | | |
|---|---|---|---|
| 3,614,419 | 10/1971 | Daughton et al. | 250/222 R |
| 3,777,152 | 12/1973 | Dorsman | 250/214 A |
| 3,816,001 | 6/1974 | Duncan et al. | 250/560 |

*Primary Examiner*—David C. Nelms
*Attorney, Agent, or Firm*—Poms, Smith, Lande & Glenny

[57] ABSTRACT

A system for detecting the edges of a moving object is disclosed having a high flux density light beam directed through two relatively long narrow light beam apertures and focused on a detector to saturate the output of the detector. When the moving object interrupts the light beam, the detector remains saturated until the moving object nearly intersects the entire light beam to thereby deactivate the detector at a precisely defined predetermined location within the light beam. The moving object reactivates the detector when its trailing edge intersects the light beam at a second precisely defined location within the light beam. An amplifier operating in saturation mode is coupled to the output of the detector to provide the added feature of switching its output when the object is at very precisely defined locations within the light beam. A computer system is coupled to the output of the amplifier to provide a pulse count to measure the time duration of the inactivity of the amplifier and to compute various physical parameters of the moving object such as velocity.

14 Claims, 4 Drawing Figures

SYSTEM FOR DETECTING THE EDGES OF A MOVING OBJECT EMPLOYING A PHOTOCELL AND AN AMPLIFIER IN THE SATURATION MODE

BACKGROUND OF THE INVENTION

Prior art devices have been used to detect the exact location of a moving object for purposes of computing the velocity of the object. Devices for accurately computing the velocity of a moving object have various applications in material testing, product testing, and other testing wherein products are subject to impact. Impact testing machines generally employ a weight or mass that falls onto a subject. The subject may deform, break, or fracture, or in some other way absorb energy from the falling weight. Various characteristics of the subject may be determined, such as fracture resistance and energy absorption of the subject material. Such subject materials may be samples of metals, plastics, or safety helmets.

These characteristics are usually obtained by drop or pendulum tests where it is necessary to measure the velocity of the moving object just prior to impact and/or just after impact. The velocity measurements are used to derive energy input, loss, absorption, and materials restitution. For example, computations of velocity may be used to compute the impact energy in accordance with the following equation:

$$E_i = \tfrac{1}{2} mV^2$$

where:
$E_i$ = Energy input
$m$ = mass of object
$V$ = velocity of object

The energy loss may be computed in accordance with the following equation:

$$E_o = \tfrac{1}{2} m (V_2^2 - V_1^2)$$

where:
$E_o$ = Energy loss
$m$ = mass of object
$V_1$ = preimpact velocity
$V_2$ = rebound of postimpact velocity The coefficient of restitution of elastic materials may be obtained from the following equation:

$$e = \frac{V_2}{V_1}$$

Various prior art devices for measuring the velocity of a moving object have been generally too expensive and/or inaccurate for simple laboratory tests. Several of these prior art devices have sought to provide a measurement of the velocity of a moving object by measuring the duration of time elapsed between the intersection of two light beams. Such devices typically include means for sensing the intersection of the light beams by the moving object, which means are coupled to analog circuitry for computing the elapsed time. The device may be pre-programmed with data with respect to the displacement between the two beams and to thereby compute the velocity of the moving object.

Such devices are typically inaccurate since they typically fail to provide intersection of the light beams to thereby activate the associated circuitry, at precisely defined locations within the respective light beams. Furthermore, the associated analog circuitry typically used to perform an integration function is sensitive to temperature and component tolerance shifts. As a result, these prior art devices fail to provide measurements of velocity which may be used to provide data which meets the required degree of accuracy.

SUMMARY OF THE INVENTION

The present invention provides a system for detecting the edges of a moving object to thereby compute the velocity of the moving object by measuring the time duration between the point of time at which the forward edge of the object intersects a precisely defined planar location within the light beam and the trailing edge of the object intersects another precisely defined planar location with the light beam. This is achieved by directing a light beam having a high flux density through two relatively long narrow light beam apertures and focused on a detector such as a photo transistor. The detector converts the light flux into an electrical signal which is transmitted to amplification means having a high numerical gain and capable of operating in a saturated mode. The operation of the amplifier in this mode enables the amplifier to change from full output to zero output with a relatively small change in the input level from the detector.

In the operation of the system, an object of unknown velocity but of known width is passed through the light beam between the two apertures. As the leading edge of the object nearly intersects the entire light beam at a precisely predetermined location within the light beam, the flux of the light beam is reduced to thereby deactivate the detector as well as the amplifier.

A computer system coupled to the amplifier initiates a counting function for purposes of counting clock pulses until the trailing edge of the object passes a second precisely determined location within the light beam. At this point of time the counting function of the computer terminates and the pulse count within the computer provides a digital reading of the elapsed time between the point of time at which the forward edge of the object intersected the first precisely determined location within the light beam and the trailing edge of the object intersected the second precisely determined location within the light beam. The computer is preprogrammed with information of the width of the moving object and the displacement between the two precisely determined locations within the light beam. With the information concerning the time elapsed between the point of time at which the forward edge of the moving object intersects the first precisely predetermined location within the light beam and the point of time at which the trailing edge of the object intersects the second precisely determined location within the light beam, the velocity of the moving object may be determined by the simple equation:

$$V = \frac{W - W_D}{\Delta t}$$

where:
$W$ = width of moving object
$W_D$ = displacement between the two precisely determined locations within the light beam.
$\Delta t$ = time displacement between the point of time at which the forward edge of the object intersects the first precisely determined location within the light beam and the point of time at which the trailing edge of the object intersects the second precisely determined location.

Accordingly, an object of the present invention is to provide means to detect the point of time at which a moving object intersects a precisely determined location within a light beam.

Another object is to provide a system for measuring the velocity of a moving object by measuring the time displacement between the point of time at which the forward edge of the moving object intersects a first precisely determined location within a light beam and the point of time at which the trailing edge of the moving object intersects a second precisely determined location within the light beam.

Yet another object is to provide means for saturating a detector using a light beam having a high flux density to provide an accurate indication of the point of time at which a moving object intersects a precisely determined location within the light beam.

Still a further object of the present invention is to provide means for accurately computing the velocity of a moving object through a light beam.

Still another object is to provide means for accurately computing the input energies, energy absorption, energy loss, and/or materials coefficients of restitution.

Other objects, advantages, and novel features of the present invention will become apparent from the following detailed description of the invention when considered in conjunction with the accompanying drawings.

DESCRIPTION OF THE PREFERRED EMBODIMENT

Figure 1:
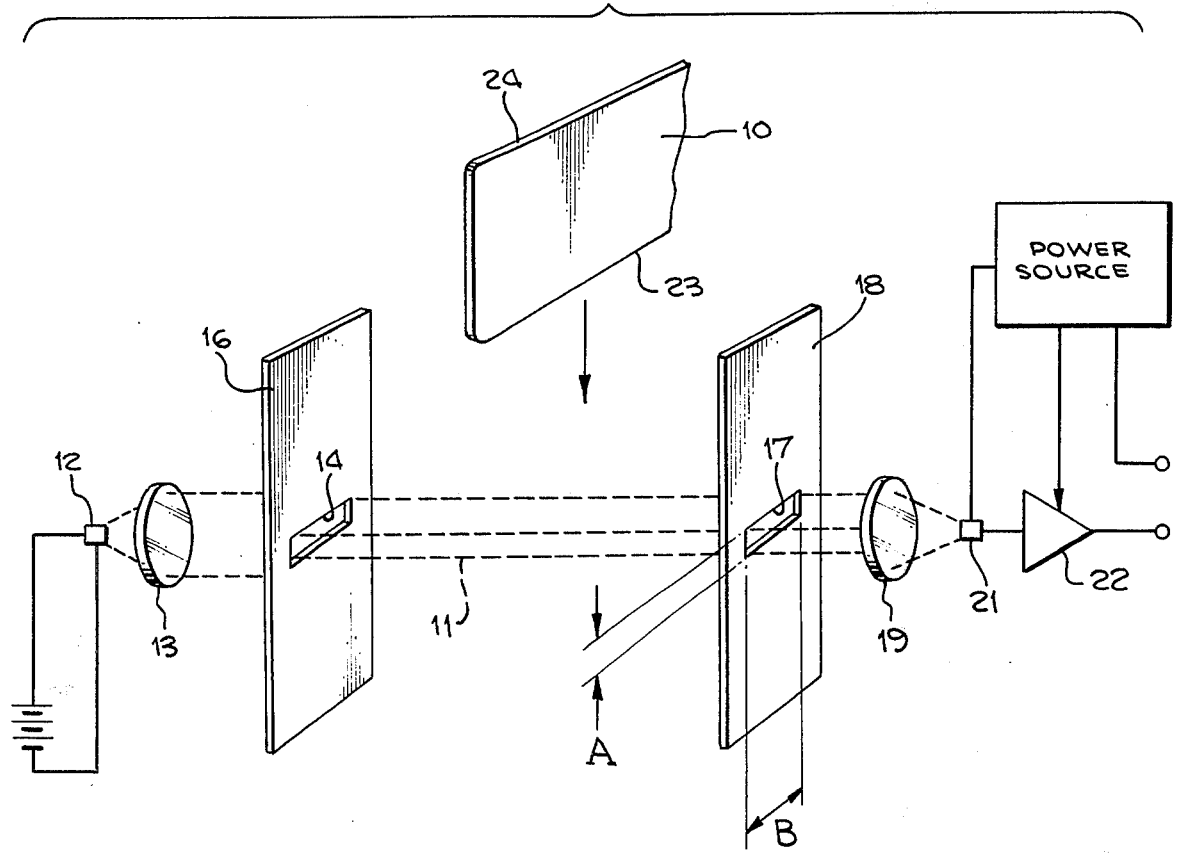
FIG. 1 is a view of the optical apparatus of the present invention.

Referring to FIG. 1, there is disclosed the system for detecting the edges of a moving object 10 at precisely determined points within a light beam 11 having a high flux density. Means for providing a high flux density light source is disclosed. In the preferred embodiment this includes a light source 12 activated by a standard voltage source which radiates optical energy which is focused by a collecting lens 13 which collimates the light to direct a light beam having a high flux density through first aperture plate means. In the preferred embodiment this is shown as aperture 14 of aperture plate 16.

When the path of the light beam 11 is unimpeded by the moving object 10, the light beam is transmitted through second aperture plate means which includes a second aperture 17 of a second aperture plate 18. The beam is focused by a second lens 19 onto photo detector means which includes a detector 21. The output of the detector 21 is coupled to the input of amplification means 22.

The detector 21 includes a small area photo transistor which converts the light flux into an electrical signal. The photo transistor has a linear relationship between the amount of flux detected and the level of electrical signal produced until the device is saturated. This relationship is known as a linear detectivity function and is usually expressed in amperes or volts produced per watt energy received. This function can be performed by devices other than photo transistors such as photodiodes, photocells, and photomultipliers.

The amplification means 22 may be any standard amplifier such as a transistor amplifier having a high numerical gain and capable of operating in a saturated mode. The saturated mode operation causes the amplification means to change its output stage from one discrete level to a second discrete level such as from full output to zero output in response to a small change in input level. The amplification means may be formed of a grouping of transistors into a gain device.

When the leading edge 23 of the moving object 10 interrupts the light beam 11, initially the saturation of the detector 21 is undisturbed and the output of the amplification means 22 is unchanged until the leading edge 23 of the moving object 10 nearly intersects the lower portion of the light beam 11 to thereby deactivate the detector at a precisely predetermined location within the light beam 11. The location within the light beam 11 at which the leading edge 23 deactivates the amplifier 22 may be determined by laboratory tests. The moving object 10 reactivates the detector 21 and the amplifier 22 when the trailing edge 24 intersects the light beam 11 at a second precisely predetermined location within the light beam. This second location may also be determined by laboratory tests.

Thus, the high flux density of the light beam 11 provides for switching of the detector 21 as well as the output of amplifier means 22 when the leading and trailing edges of the moving object 10 are at a precisely predetermined locations. The width of the object then is predetermined and the displacement between the two precisely predetermined locations within the light beam 11 are premeasured and with this information as well as the computation of the period of time during which the amplifier 22 is in its changed state due to the deactivation of the detector, the velocity of the moving object 11 may be determined by the simple equation:

$$V = \frac{W - W_d}{\Delta t}$$

The light source 12 may be any standard source of light energy such as a light emitting diode (LED), or a thermal, gas discharge or stimulated light amplification (laser) devices.

Although it has been found to be beneficial to use the lens 13 in order to obtain the needed high flux density in the opening of the aperture 14, it may be possible to eliminate the lens 13 depending upon the relationship of the beam-defining aperture 14 to the source 12.

As shown in FIG. 1, the thickness, A of beam 11 is rather small in comparison with the width, B, of the beam 11. The ratio of the width B to the thickness A is preferably in the order of 10:1 or greater. Although it is essential that the light flux be merging through aperture 14 is uniform in the thickness dimension, A, the uniformity across the width dimension, B, may be allowed to vary.

The second aperture 17 of the second aperture plate 18 is shown having a shape which is identical to that of the first aperture 14. Nevertheless, it is not necessary that the second aperture 17 be identical in shape to the first aperture 14 provided the exact location within the beam 11 at which the amplification means 22 is switched is determined.

The moving object 10 may be attached to a falling weight of a machine such as an impact testing machine to test the breaking strength of material such as plastic or metal. The optical system may be attached to the stationary frame of the machine. Alternatively, the moving object 10 may be suspended from a pendulum apparatus with the light beam 11 rotated so that the thickness dimension is parallel to the path of travel of the moving object 10 and placed at a location in the path of the moving object 10 where the acceleration thereof is zero. This avoids the requirement of a compensation of the velocity computation for acceleration of the moving object while it is passing through the light beam 11.

In the operation of the system with the detector 21 operating in saturation mode, the ratio of optical flux used to the amount to just saturate the detector is greater than unity and in the preferred embodiment in the order of 4:1. The ratio is maintained particularly large to avoid any problems of component variation with time or production inaccuracy and to further eliminate any trimming or calibration problems in the field. This feature of the present invention is particularly significant since prior art devices do not operate in well defined geometrical and electronic saturation modes.

Figure 2A:
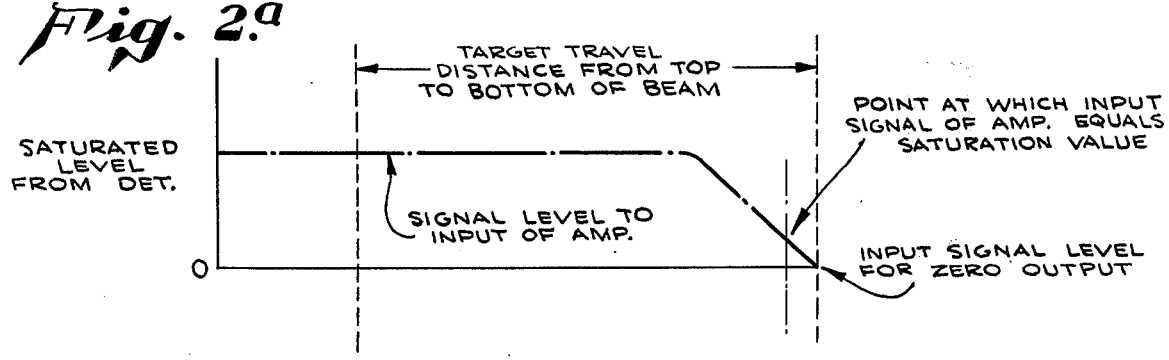
FIG. 2a is a transfer function of the detector of the present invention.

The transfer function of the detector operating in saturation mode is shown in FIG. 2a. The curve shows the detector output for the object 10 acting as a shutter to the beam 11. The units are arbitrary and the curve shows the signal which is the output signal of the detector 21. It is seen that with the saturation flux ratio in the order of four, the detector 21 is not switched until the target travels to a point near the lower edge of the beam 11.

The amplifier 22 operates in the saturation mode also. The detector output signal is calibrated so that the ratio of the signal when the detector is completely on to the signal when the detector is off, signifying the position of the target blade with respect to the light beam, is larger than the ratio of the signal magnitude required at the amplifier input to cause the output of the amplifier to change from zero to full magnitude. In the case where no further increase in input signal can cause an increase in output signal of the amplifier, the amplifier is operating in saturation mode. This ratio is larger than unity and in the present embodiment, the value of the ratio is in the order of 10:1. This provides the added feature that very small motions of the target within the thickness of the beam will cause the amplifier stage to change from zero to full output, or vice-versa, having the effect of reducing the electrical thickness of the beam to very small values as compared to the mechanical limits of the apertures 14 and 17.

Figure 2B:
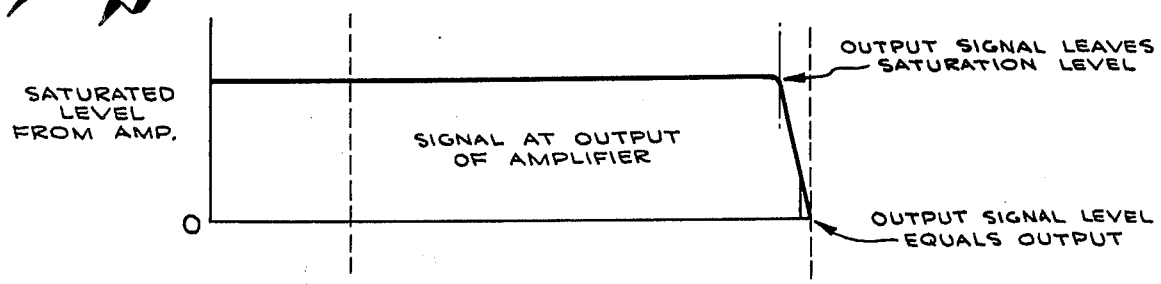
FIG. 2b is a transfer function of the amplifier of the present invention.

The transfer function of the amplifier 21 is shown in arbitrary units in FIG. 2b. This transfer function shows a curve of amplifier output as a function of the target travel across the beam. With this arrangement, the effect of beam thickness can be further reduced by a ratio of 10 to 1 or greater.

In the preferred embodiment, the beam thickness is 0.010 inch. With a saturation flux level for the detector of 4/1, the effective beam thickness insofar as the output of the detector is concerned is reduced to 0.0025 inch. With the amplifier operating in saturation mode, the effective beam thickness can be further reduced by the ratio of 10:1 if the ON to OFF ratio of the detector output signal is 10:1 or greater. Th total effective beam thickness may be obtained by multiplying the inverse ratio of the detector by the inverse ratio for the amplifier. In the present embodiment this is as follows:

$$\frac{1}{4} \times 1/10 \times 0.010 \text{ inch} = 0.00025 \text{ inch}$$

As indicated above, the velocity of the moving object is computed using the equation:

$$V = \frac{W - W_d}{\Delta t}$$

For example, if the beam is 0.010 inch wide and the amplifier 22 switches when the leading edge 23 of the moving object 10 is 0.006 inch from the top of the beam 11, the trailing edge 24 of the moving object 10 causes the amplifier 22 to switch its state again when the trailing edge 24 is 0.004 inch from the top of the beam 11. In this case, $W_d$ is computed as follows:

$$W_d = 0.006 - 0.004 = 0.002 \text{ inch}$$

In the case in which the switching occurs when the leading edge is 0.001 inch away from the bottom of the beam 11, $W_d$ is computed as follows:

$$W_d = 0.009 - 0.001 = 0.008 \text{ inch}$$

It can further be seen that when the switching occurs halfway between the top and bottom of the beam 11, $W_d = 0$ and no correction is needed.

Figure 3:
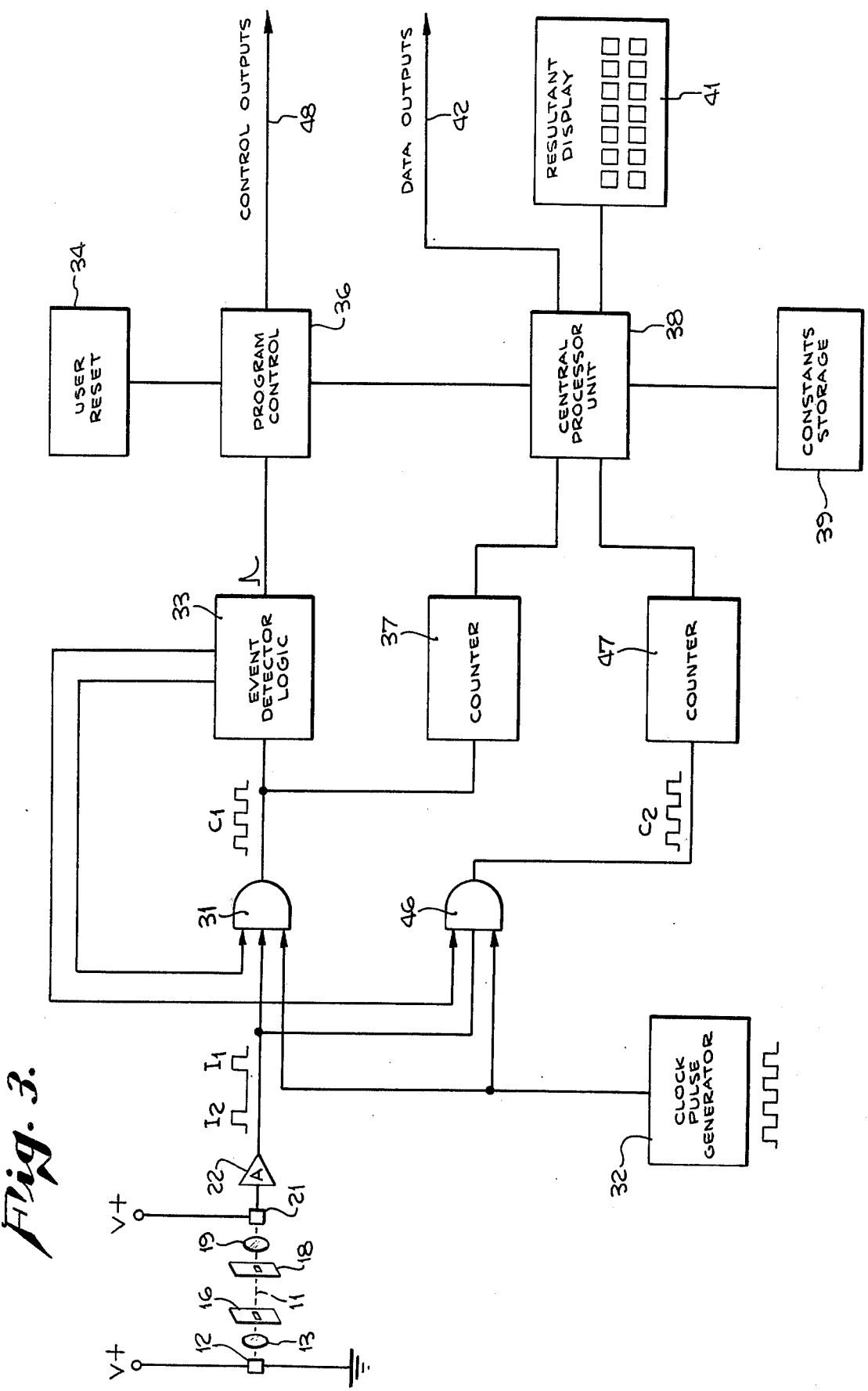
FIG. 3 is a block diagram of the system of the present invention including the computer for calculating the velocity of the moving object as well as various functions that can be derived from the velocity computation.

The value of $W$ may be predetermined by standard measurement techniques and the values of both $W$ and $W_d$ may be programmed into a computer shown in FIG. 3 which is coupled to the output of the amplifier 22 to measure $\Delta t$ and compute the velocity of the moving object 10.

Computing means for providing the computations is shown in the block diagram of FIG. 3. It should be emphasized that although the computer system shown in FIG. 3 has the capacity to perform two measurements, such as pre-impact velocity of a moving object on an impact testing machine and post-impact velocity of the moving object, the computer system may satisfactorily provide one velocity computation using only one gate and one counter.

The detector 21 and the amplifier 22 shape the pulse caused by the interruption of the light beam 11 by the moving object 10 and direct a fast rising pulse $I_1$ to an AND logic gate 31 which has a second input from the clock pulse generator 32. A third input to gate 31 is from event detector logic circuit 33 which determines when the pulse $I_1$ has terminated and blocks the AND gate from passing any further clock pulses from clock pulse generator 32. This feature prevents the accidental transmission of clock pulses through the gate 31 by multiple beam interruptions of the optical beam.

The event detector logic is controlled by a user reset unit 34 through a program control 36. When the user reset unit 34 resets the event detector logic 33 to be in the ready condition, the pulse from the amplifier means 22 activates the AND gate 31 to transmit a number of clock pulses to a counter 37. The number of clock pulses provides a measurement of the interval of time between the point of time at which the leading edge 23 of the moving object 10 passes a first predetermined location within the light beam 11 and the point of time at which the trailing edge of the moving object 10 passes a second precisely predetermined location within the light beam 11. The count of pulses in the counter 37 are transmitted to a central processor unit 38 which is also controlled by the program control 36. The central processor unit 38 is fed with constants from constants storage unit 39 to provide the desired computations. In order to compute the velocity of the moving object, the central processor unit 38 must be fed with information as to the width of the object and the displacement between the first predetermined location within the beam 11 and the second predetermined location within the beam 11. It will be apparent to anyone having ordinary skill in the art that the central processor unit 38 may be programmed to compute various other physical parameters such as energy input loss, absorption and restitution. The desired computation may be displayed on a resultant display board 41 which may be any suitable digital readout means such as LED's. In addition, the computed data may be transmitted to any other source along data output line 42.

A second AND gate 46 has inputs also coupled to the output of the amplifier 22, the clock pulse generator 32 and the event detector logic 33 in a manner similar to the input connections for AND gate 31. The AND gate 46 is responsive to a fast rising input pulse $I_2$ and is coupled to a second counter 47 which is also coupled to the central processor unit 38 in a manner similar to the coupling of counter 37. The event detector logic 33 selectively controls the AND gates 31 and 46 to enable AND gate 31 to provide a first velocity measurement such as pre-impact velocity and to enable AND gate 46 to transmit clock pulses to provide a second velocity measurement such as post-impact velocity. The event detector logic 33 thereby insures that the counters 37 and 47 provide representations of the time intervals associated with the two separate velocity computations. In addition, it prevents any unwanted third velocity measurement.

The various components of the computing system shown in FIG. 3 are standard devices well known in the art. The central processor unit 38 may be any standard microprocessor or calculator. The program control 36 may be any standard switching device which may be programmed by the selective closure of the switches to sequentially command the central processor unit 38 and may be responsive to the event detector logic 33 at the end of a time interval to synchronize the operation of the central processor 38 to receive the information from the counters 37 and/or 47 and process the data. The program control unit 36 may also control the event detector logic 33 via the user reset unit 34 to reset the event detector logic 33 as well as counters 37 and 47 before each measurement. The program control 36 may also control outputs through a control output line 48.

Obviously many modifications and variations of the present invention are possible in the light of the above teachings. It is therefore to be understood that within the scope of the appended claims, the invention may be practiced otherwise than as specifically described.

I claim:

1. A device for detecting the leading and trailing edges of a moving object comprising:
    means for providing a high flux density light source,
    first aperture plate means positioned in close proximity to said means for providing a high flux density light source and including an aperture for forming a high flux density light beam having a predetermined geometrical relationship to provide a uniform flux density in at least one dimension,
    second aperture plate means spaced apart from said first aperture plate means to enable the moving object to pass therebetween and including a second aperture,
    photo detector means positioned in close proximity to said second aperture and operated in saturation mode for providing an output signal for measuring the time interval from the point of time at which the leading edge of the moving object intersects a first predetermined location within said light beam and the point of time at which the trailing edge of the moving object intersects a second predetermined location within said light beam.

2. The device as described in claim 1 and further including amplification means having an input coupled to the output of said detector means and operating in saturation mode and having two stable output states for providing an output signal for measuring the time interval from the point of time at which the leading edge of the moving object intersects the first predetermined location within said light beam and the point of time at which the trailing edge of the moving object intersects the second predetermined location within said light beam.

3. The device as described in claim 2 and wherein said photo detector means has a linear detectivity function between its inactive state and its saturated output state.

4. The device as described in claim 3 and wherein said means for providing a high flux density light source provides light having a flux density having at least in the order of four times the amount required to operate said photo detector means in its saturation mode.

5. The device as described in claim 2 and wherein said amplifier operating in saturation mode includes a transistor having a high numerical gain whereby a small change in input from said photo detector means causes said amplification means to change from one stable output state to a second stable output state.

6. The device as described in claim 5 and wherein said photo detector provides an input signal to said amplification means operating in saturation mode having a magnitude which is at least in the order of ten times the magnitude necessary to cause said amplification means to operate in saturation mode to thereby cause said amplification means to switch its output state when said leading edge of the object intersects said first predetermined location and said trailing edge of said object intersects said second predetermined location.

7. A system for computing the time interval between the point of time at which the leading edge of a moving object intersects the first predetermined location and the point of time at which the trailing edge of the moving object intersects a second predetermined location comprising:
    means for providing a high flux density light beam with said first and second predetermined locations located within said light beam, said light beam having a predetermined geometrical relationship having a uniform flux density in at least one dimension, photo detector means positioned in the path of said light beam and operated in said saturation mode, amplification means having an input coupled to the output of said photo detector and operating in saturation mode for providing an output signal indicative of the time duration between the point of time at which the leading edge of the object intersects the first predetermined location within said light beam and the point of time at which the trailing edge of the object intersects the second predetermined location within said light beam and, computing means coupled to the output of said amplification means for computing the time duration between the point of time at which the leading edge of the object intersects the first predetermined location within said light beam and the point of time at which the trailing edge of the object intersects the second predetermined location within said light beam.

8. The system as described in claim 7 and wherein said computing means includes:

a clock pulse generator for providing a train of clock pulses, a first AND gate having a first input coupled to the output of said clock pulse generator and a second input coupled to the output of said amplification means for transmitting a number of clock pulses when said amplification means enables said AND gate, and a first counter having an input coupled to the output of said first AND gate for counting the clock pulses transmitted by said first AND gate.

9. The system as described in claim 8 and further including:

a central processor unit coupled to said first counter, a constants storage unit coupled to said central processor unit, and a program control unit coupled to said central processor unit to program said central processor unit to process the information in said first counter to thereby compute the velocity of said moving object.

10. The system as described in claim 9 and further including display means including a digital readout device.

11. The system as described in claim 8 and further including:

a second AND gate having a first input coupled to the output of said clock pulse generator and a second input coupled to the output of said amplification means for transmitting a number of clock pulses when said amplification means includes said second AND gate, and a second counter having an input coupled to the output of said second AND gate for counting the clock pulses transmitted by said second AND gate.

12. The system as described in claim 11 and further including event detector logic means coupled to the input of said first and second AND gates for selectively enabling said first and second AND gates to transmit different trains of clock pulses for providing measurements of two distinctive time intervals.

13. The system as described in claim 10 and further including a central processor unit coupled to said first and second counter, a constants storage unit coupled to said central processor unit, and a program control unit coupled to said event detector logic means and said central processor unit to thereby program said central processor unit to process the information in said first and second counters to thereby provide two separate velocity computations of said moving object.

14. The system as described in claim 13 and further including display means including a plurality of light emitting diodes for visually displaying the results in the processing of the information by said central processor unit.

* * * * *